Nov. 10, 1931. T. FERRY 1,830,787
CAP NUT AND METHOD OF MAKING THE SAME
Filed Feb. 8, 1928

Inventor
Thomas Ferry
By Evans & McCoy
Attorney

Patented Nov. 10, 1931

1,830,787

UNITED STATES PATENT OFFICE

THOMAS FERRY, OF CLEVELAND, OHIO

CAP NUT AND METHOD OF MAKING THE SAME

Application filed February 8, 1928. Serial No. 252,776.

This invention relates to cap nuts and methods of making the same, the cap nut being of the type in which a cup-shaped cap covering the threaded bore is permanently attached to the top of the nut.

The invention has for its object to provide a cap nut and method of making the same in which the body of the nut and cap are so formed that both may be rapidly and cheaply manufactured by means of automatic machinery and in which the cap and the body of the nut may be permanently joined together by a simple press operation.

A further object of the invention is to provide a cap nut which may be manufactured without machining operations other than the threading of the bore.

A further object of the invention is to provide a cap nut, the body or solid portion of which is of simple design, that can be manufactured automatically on any of the standard types of machines that are now in use for the production of the ordinary hexagon nuts.

With the above and other objects in view, the invention may be said to comprise the cap nut as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which.

Referring to the accompanying drawings, the body portion of the nut is provided with a polygonal base portion 11 and a cylindrical cap receiving projection 12 extending upwardly from the base portion and of smaller diameter than the base portion, the nut being provided with an axially threaded bore 13 extending through the base and projection.

Figure 1:
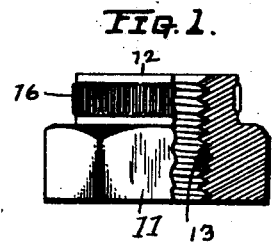
Figure 1 is a sectional elevation showing half of the body portion of the nut in side elevation and half thereof in section.
Figure 2:
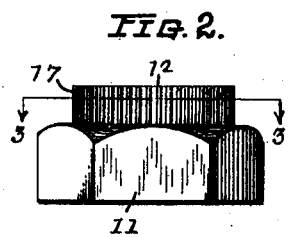
Fig. 2 is a side elevation showing the body portion of a cap nut having a serrated projection of a form slightly different from that shown in Fig. 1.
Figure 3:
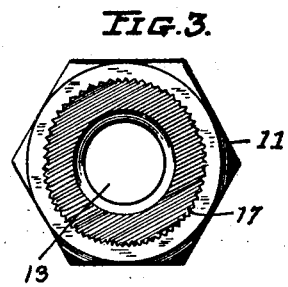
Fig. 3 is a section taken on the line indicated at 3—3 in Fig. 2.
Figure 4:
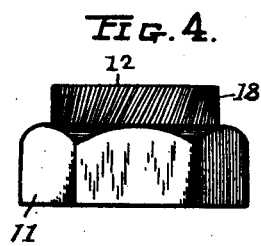
Fig. 4 is a side elevation showing the body portion of a cap nut provided with a cap receiving projection with laterally inclined serrations.
Figure 5:
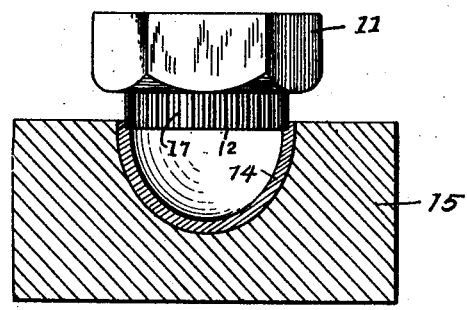
Fig. 5 is a view showing the method of applying the cap to the nut.
Figure 6:
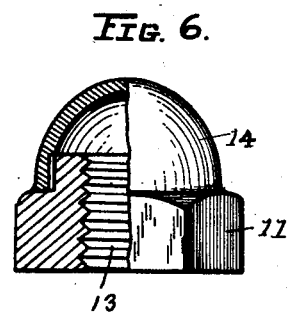
Fig. 6 is a sectional elevation showing one-half of the finished cap nut in section and the remainder in side elevation.
Figure 7:
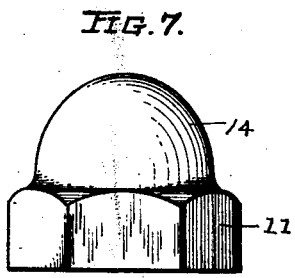
Fig. 7 is a side elevation of the finished cap nut.

The projection 12 receives a cup-shaped metal cap 14 such as shown in Figs. 5, 6 and 7 and the peripheral surface of the projection is provided with serrations such as illustrated in Figs. 1, 2 and 4 which serve when the cap is pressed onto the projection to permanently lock the cap to the body of the nut. The cup-shaped cap 14 is made of an internal diameter at its open end slightly less than the external diameter of the projection and in applying the cap to the body of the nut, the cap is held as shown in Fig. 5 in a die 15 conforming to the outer surface thereof and the serrated projection 12 of the nut is forced into the cap by downward pressure so that the serrations of the projection are forced into the wall of the cap displacing the metal and causing the cap to firmly grip the projection and be rigidly and permanently locked thereto. The serrations on the periphery of the projecting portion 12 of the nut may be of various forms, preferably such as may be produced rapidly in an automatic machine by means of a rotating tool. The serrations may, as shown at 16 in Fig. 1, extend only partially across the peripheral surface of the projections or, a projection may be provided as shown in Fig. 2 with serrations 17 extending completely across the peripheral portion. In Fig. 4 a further modification is shown in which the projection is provided with serrations 18 which are inclined laterally across the peripheral surface of the projection.

Regardless of the particular form of the serrations on the periphery of the projection, the upsetting of the metal at the periphery of the projection in forming the serrations hardens the metal of which the teeth are composed so that the serrations hold their form when pressed into the cap and the metal of the cap, when the projection is pressed into the cap, is compressed in the space between the serrations sufficiently to permanently interlock the cap with the body of the nut. The cap is applied to the nut body by means of a suitable press which forces the nut downwardly into the cap held in the recess of the die 14 which may be mounted on the bed of the press.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A cap nut comprising a polygonal base portion, a projection above the base portion of less diameter than the base portion and having a serrated periphery, and a cap covering the projection, the peripheral serrations being pressed into and completely embedded in the wall of the cap.

2. A cap nut comprising a polygonal base portion, a projection above the base portion of less diameter than the base portion and having closely spaced axially extending serrations on its periphery, and a cap covering the projection, the peripheral serrations being pressed into and completely embedded in the wall of the cap.

3. A cap nut comprising a polygonal base portion, a projection above the base portion of less diameter than the base portion and having closely spaced serrations on its periphery extending axially from the top to the bottom thereof, and a cap having its open end fitting over said projections, the peripheral serrations being pressed into and completely embedded in the wall of the cap.

4. The herein decribed method of applying a cap to a nut which comprises forming the nut with an externally serrated axial projection, forming the cap with an internal diameter slightly less than the external diameter of the projection and forcing the projection into the cap under pressure while holding the cap against expansion.

In testimony whereof I affix my signature.

THOMAS FERRY.